(12) United States Patent
Frey

(10) Patent No.: US 9,080,541 B2
(45) Date of Patent: Jul. 14, 2015

(54) GUIDE PIN FOR A STARTING ELEMENT

(71) Applicant: ZF Friedrichshafen AG, Friedrichshafen (DE)

(72) Inventor: Peter Frey, Gerolzhofen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 247 days.

(21) Appl. No.: 13/677,529

(22) Filed: Nov. 15, 2012

(65) Prior Publication Data
US 2013/0125852 A1 May 23, 2013

(30) Foreign Application Priority Data

Nov. 17, 2011 (DE) .......................... 10 2011 086 564

(51) Int. Cl.
| F02N 15/00 | (2006.01) |
| B21D 22/20 | (2006.01) |
| F16H 41/28 | (2006.01) |
| F16H 45/02 | (2006.01) |
| F16D 33/00 | (2006.01) |
| F16F 15/129 | (2006.01) |
| H02K 7/02 | (2006.01) |
| F16D 33/18 | (2006.01) |
| B23P 11/00 | (2006.01) |

(52) U.S. Cl.
CPC ................ *F02N 15/00* (2013.01); *B21D 22/20* (2013.01); *F02N 15/006* (2013.01); *F16H 41/28* (2013.01); *F16H 45/02* (2013.01); *B23P 11/00* (2013.01); *F16D 33/00* (2013.01); *F16D 33/18* (2013.01); *F16F 15/129* (2013.01); *H02K 7/02* (2013.01); *Y10T 29/49826* (2015.01)

(58) Field of Classification Search
CPC ......... F16F 15/129; F16D 33/00; F16D 33/18
USPC .............. 123/185.1, 179.25, 179.1; 192/3.33, 192/3.29, 3.28; 464/68.4
See application file for complete search history.

(56) References Cited

U.S. PATENT DOCUMENTS

| 3,545,883 | A | * | 12/1970 | Iijima | ........................ | 416/197 R |
| 4,523,916 | A | | 6/1985 | Kizler et al. | | |
| 5,788,034 | A | * | 8/1998 | Maruki et al. | ............... | 192/3.29 |
| 6,112,869 | A | * | 9/2000 | Krause et al. | ................ | 192/3.29 |
| 6,277,027 | B1 | | 8/2001 | Schoder et al. | | |
| 6,298,965 | B1 | * | 10/2001 | Krause et al. | ................ | 192/3.29 |
| 6,528,918 | B2 | * | 3/2003 | Paulus-Neues et al. | .... | 310/75 R |
| 2002/0027053 | A1 | * | 3/2002 | Back et al. | ....................... | 192/3.3 |
| 2008/0121485 | A1 | * | 5/2008 | Degler et al. | ................. | 192/3.29 |
| 2008/0149444 | A1 | * | 6/2008 | Degler | .......................... | 192/3.33 |
| 2010/0059324 | A1 | * | 3/2010 | Biermann | ................... | 192/3.29 |

* cited by examiner

*Primary Examiner* — Mahmoud Gimie
(74) *Attorney, Agent, or Firm* — Cozen O'Connor

(57) ABSTRACT

A starting element has a housing (4) and a guide pin (6) for centering the starting element during assembly. The guide pin (6) is made of sheet metal and is connected to the housing (4) by means of a positive connection. A method of producing such housing of a starter element is also disclosed.

13 Claims, 2 Drawing Sheets

GUIDE PIN FOR A STARTING ELEMENT

BACKGROUND OF THE INVENTION

1. Field of the Invention

The present invention is directed to a starting element for an engine, particularly having a torque converter or a hydrodynamic torque converter with a housing and a guide pin for centering the torque converter during assembly.

2. Description of the Related Art

Hydrodynamic torque converters are often used as a starting element in motor vehicles with automatic transmissions, i.e., the force is transmitted via the hydrodynamic converter during starting or accelerating from a stationary condition. After starting, the converter can be bypassed by a converter lockup clutch to increase efficiency and minimize converter losses. A starting element or hydrodynamic starting element in this sense is also a hydro clutch in which no torque conversion takes place because, in contrast to the hydrodynamic torque converter, it has no stator causing the torque increase. In addition to hydrodynamic coupling devices of this kind, other forms of wet-running and dry-running elements, e.g., centrifugal clutches, can also be used as starting elements.

When mounting a starting element, for example, a torque converter or hydrodynamic torque converter, on the engine, for example, on the flywheel, it is necessary to center the crankshaft axis and rotational axis of the torque converter as exactly as possible with respect to one another so that there is no axial misalignment that could lead to losses and imbalances in the drivetrain. To this end, a central guide pin is often arranged at the housing or at the housing cover or housing part of the torque converter that faces the drive motor. During assembly, this guide pin engages in a corresponding bore hole in the crankshaft or flywheel so that the rotational axes of the two units are aligned with one another. After centering by means of the guide pin, the two units are often screwed together by means of flexplates, i.e., flexible connection elements which compensate for axial oscillations.

After screwing together, the guide pin essentially serves no purpose and can even be an impediment. For example, an axial oscillation, a slight temporary axial offset or a tilting of the torque converter relative to the drive unit can be compensated by the connection through the flexplate. However, force is also transmitted through the guide pin during movements of this kind and enters the housing of the torque converter, which can hamper compensation. In addition, force entering at the guide pin, for example, in the weld connections typically used between guide pin and the cover of the torque converter housing, can lead over the long term to material fatigue and cracks in the housing or housing cover.

U.S. Pat. No. 6,277,027, for example, shows a center pin which is turned or milled from a rigid material, for example, from a solid metal material, and which is arranged at the housing of a torque converter for centering. The solid and stable center pin transmits all of the forces directly into the housing of the converter and can accordingly lead to the tensions or damage to the converter housing described above.

U.S. Pat. No. 4,523,916 describes a torque converter in which the guide pin is formed as part of the housing, which clearly leads to the same problems as well as a rigid connection of the guide pin to the flexplates used for connecting to the drive unit.

Therefore, there is a need to ensure an improved force absorption connection between the guide pin and the housing of the starting element.

SUMMARY OF THE INVENTION

According to the embodiments of the present invention, this object is met in that a starting element is used which has a guide pin for centering the starting element during assembly, wherein the guide pin is formed of sheet metal and is connected to the housing by means of a positive connection.

By using a guide pin of sheet metal, this guide pin can by virtue of its inherent flexibility at least partially compensate for movements between the housing of the starting element and the engine-side connection through elastic deformation so that no high forces can enter the cover or housing of the starting element. In other words, the guide pin made of sheet metal is inherently flexible and can accordingly comply elastically to deformations, which also makes it possible to use a solid connection plate, for example, a solid flywheel on the engine side, because the latter need no longer have elasticity within the overall system.

Moreover, by using a positive connection instead of a weld, there is no mixing of materials at the connection site and no alteration in the material of the housing of the starting element or torque converter at the site of the connection to the guide pin, which further reduces the risk of damage to the housing through the effects of fatigue.

In some embodiments of the invention, the maximum wall thickness of the sheet metal from which the guide pin is shaped is less than 3 mm in order to achieve the desired elasticity characteristics. In other embodiments, the maximum wall thickness can be limited to 2 mm or even 1 mm to accommodate given constructional requirements. Besides the thin sheet metals mentioned above, thick sheet metals with thicknesses of 3 mm and more can also be used in other embodiments depending on the dimensioning of the wet-running or dry-running starting elements that are used. As per the common definition, by sheet metal is meant herein a flat rolled finished product of any metal or any metal alloy which may possibly also be coated with one or more surface coats.

In some embodiments of the invention, the guide pin is produced by means of an individual positive connection in the center of the guide pin, i.e., arranged in the center of an interface between guide pin and housing. As a result, minimal lever arms occur in all possible directions of offset and oscillation and, therefore, the minimum possible force enters the housing because the connection is already flexible due to the selected position of the connection.

In some embodiments, a TOX connection is used as positive connection in order to keep the connection flexible and the alteration of material in the housing cover to a minimum. In a TOX connection system, the two structural component parts to be joined are placed one on top of the other and pressed by a punch into a die cavity arranged on the opposite side from the punch. The shaping of the punch and die cavity forces the material on the punch side to flow behind the material on the die cavity side, thus generating a positive connection. In so doing, the materials to be joined are not mixed together so that no weak spots are formed, and even passivation layers or corrosion-resistant layers arranged on the sheet metals to be joined are preserved in the connection.

In housings of starting elements in which the housing covers were produced by a deep drawing process so that the thickness of the housing cover decreases toward the center, the TOX method is suitable for connecting with the sheet metal pin which is likewise thin-walled especially because, for example, TOX connections can advantageously be produced between sheet metals or materials having similar wall thicknesses.

In some embodiments, the guide pin further has at its end remote of the housing an insertion bevel which facilitates centering of the converter housing relative to the crankshaft or the unit to be connected. The insertion bevel can be produced during production of the guide pin or torque converter.

In the process of producing a housing of a torque converter, the housing cover is connected with the guide pin by a positive connection.

In order to achieve a highly precise centering in spite of the guide pin being produced, for example, from cold-formed sheet metal, the guide pin can be machined after the positive connection with the housing cover has been carried out. As a result, in case of cutting machining, for example, a very precise centering of the effective diameter of the guide pin can be achieved by machining because the housing cover and pin are machined in a single chucking of the machine tool.

During machining, for example, turning, the given standardized diameter of the guide pin can be produced and a highly precise centering can be achieved even if the guide pin is made of cold-formed sheet metal. In addition, an insertion bevel which facilitates assembly of the torque converter can be produced while machining the joined guide pin.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred embodiments of the present invention will be described in more detail in the following with reference to the accompanying drawings in which.

DETAILED DESCRIPTION OF THE PRESENTLY PREFERRED EMBODIMENTS

Figure 1:
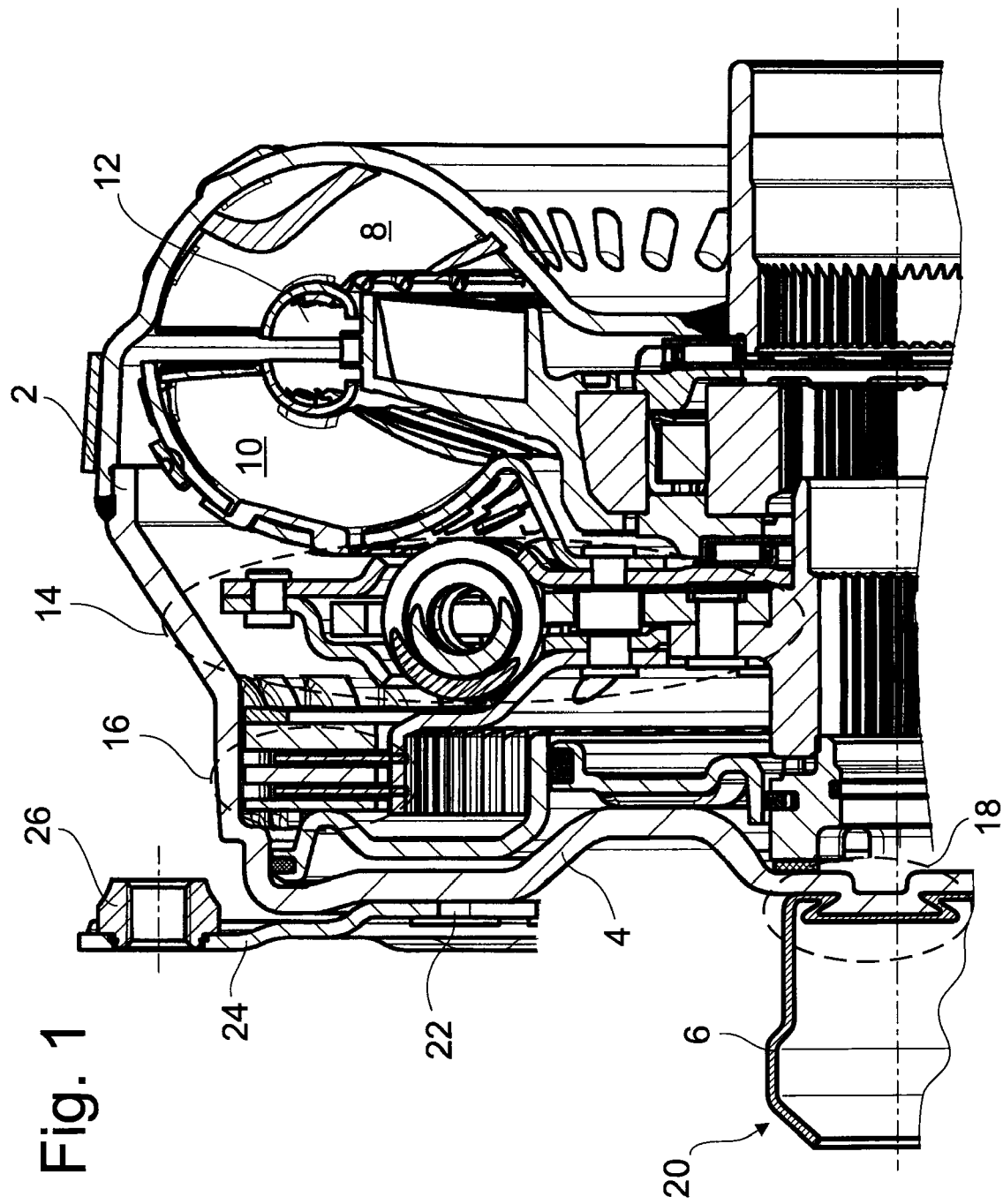
FIG. 1 is a sectional view through one half of a torque converter.
Figure 2:
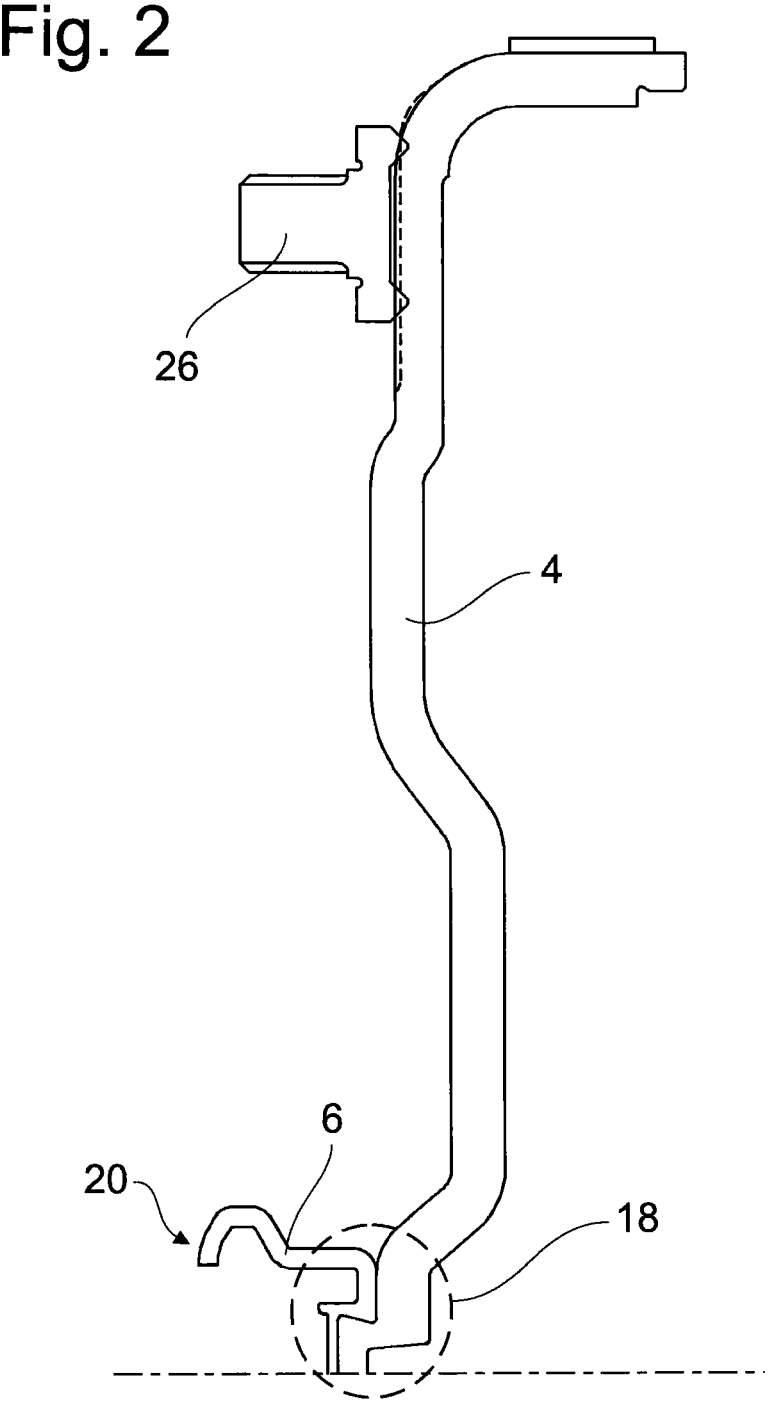
FIG. 2 is an enlarged detail from the sectional view from FIG. 1.

Since FIG. 2 shows selected components from FIG. 1, both drawings will be described in common in the following, and identical reference numerals denote identical or functionally similar components so that the statements made with respect to one drawing are also applicable to corresponding components in the other drawing.

Since the embodiments of the present invention relate particularly to the connection of a guide pin 6 to the housing part or housing cover 4 of the housing of a starting element, there will be no detailed discussion of the other assemblies present within the torque converter which is shown as an example of a starting element. Accordingly, the typical components of a torque converter, i.e., the impeller 8, turbine 10 and stator 12, and the torsional vibration damper 14 and converter lockup clutch 16 which are likewise provided are mentioned here purely for the sake of completeness.

The housing cover 4 is connected to the guide pin 6 by an individual TOX connection 18 arranged in the center with respect to the guide pin. Without limiting generality, housing cover 4 is understood herein to designate the integrally formed portion of the housing of the torque converter to which the guide pin 6 is connected. In the present instance, the housing cover 4 is also produced by a deep drawing process which results in the narrowing of the material cross section indicated in FIG. 1 in the central region of the housing cover 4 so that a reliable and flexible connection to the guide pin 6 of sheet metal can be produced in this region by means of a TOX connection 18.

At the end of the guide pin 6 remote of the housing 2 or housing cover 4, this guide pin 6 has an insertion bevel 20 to facilitate assembly of the torque converter. In this respect, the insertion bevel 20 can be produced during the process of producing the guide pin 6 by cold forming or, according to an alternative method, it can be produced by machining the guide pin 6 after the guide pin 6 has already been connected by positive engagement to the housing cover 4, for example, by means of the TOX connection 18.

Further, a flexplate 24, i.e., a flexible element, is arranged at the housing cover 4, by means of which the housing cover 4 or housing 2 of the torque converter can be connected to a drive unit so as to be fixed with respect to rotation relative to it. In the illustrated example, the flexplate 24 is positively connected to the housing cover 4 by a piercing rivet connection 22. For connecting to the drive unit, FIGS. 1 and 2 show connecting elements at the flexplate, for example, a threaded hole or bore through which a screw can be guided, for example.

As a result of the separation of flexplate 24 and guide pin 6, in the case of a guide pin 6 of sheet metal, the bearing support with respect to the drive unit is achieved in the desired manner predominantly by means of the flexplate 24 without additional force being transmitted through the guide pin 6, which can prevent material fatigue and negative influences on the drivetrain.

As has already been noted above, the central positive connection results in a flexible construction thereof, which has positive results for durability and for the transmission of noises (up to the bearing support, e.g., of the torque converter at the impeller throat in the transmission) in operation. The flexibility of the guide pin is all the more important as it can already be anticipated at the present time that greater axial stiffness of the flywheel will be expected in future flywheel constructions, for example, in the automotive field. Aside from the advantages mentioned above with respect to the force absorption connection, the use of sheet metal for producing the guide pin also has technical advantages with respect to production because production costs can be reduced in this way and an optimal use of material can be achieved as a result of dispensing with a number of cutting steps.

Although the preceding discussion deals mainly with the connection of a torque converter to a motor vehicle or passenger car where the torque converter serves as starting element, torque converters according to the invention with guide pins can also be used in any other application, for example, in stationary engineering, in trucks, in agriculture, etc. It goes without saying that torque converters can also be used in other applications which do not have the torsional vibration dampers or converter lockup clutches shown by way of example in the drawings.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A starting element comprising:
   a housing (4); and
   a guide pin (6) disposed for centering the starting element during assembly with respect to a crankshaft axis, said guide pin (6) being formed of sheet metal and connected to the outside of said housing (4) by means of a positive connection (18); and
   wherein said guide pin (6) has a maximum wall thickness of less than 3 mm.

2. The starting element according to claim 1, wherein said guide pin (6) is connected to said housing (4) by means of said individual positive connection (18) arranged in the center of an interface between said guide pin (6) and said housing (4).

3. The starting element according to claim 1, wherein said guide pin (6) is connected to said housing (4) by means of a TOX connection.

4. The starting element according to claim 1, wherein said guide pin (6) comprises an insertion bevel (20) at an end remote of said housing (4).

5. The starting element according to claim 1, additionally comprising connection elements (26) and at least one connection sheet metal (24) connected to said housing (4) to connect said starting element to a rotating drive unit via said connection elements (26) arranged at said connection sheet metal (24).

6. The starting element according to claim 1, wherein the starting element comprises one of a hydro clutch and a hydrodynamic torque converter.

7. A method of producing a housing of a starter element comprising the steps of:
   providing a guide pin (6) made from sheet metal;
   providing a housing cover (4) of the housing (2); and positively connecting the guide pin (6) to the outside of the housing cover (4); and
   wherein the step of providing the guide pin (6) comprises shaping the guide pin 6 from sheet metal.

8. The method according to claim 7, additionally comprising the step of machining the guide pin (6) after the positive connection so as to obtain a centered guide pin (6) of a given standardized diameter.

9. The method according to claim 7, wherein the step of providing the housing cover (4) comprises deep drawing the housing cover (4) from sheet metal.

10. The method according to claim 8, wherein the step of machining is performed by cutting machining.

11. The method according to claim 8, wherein the step of providing the guide pin (6) comprises shaping the guide pin (6) from sheet metal.

12. The method according to claim 8, wherein the step of providing the housing cover (4) comprises deep drawing the housing cover (4) from sheet metal.

13. The method according to claim 7, wherein the step of providing the housing cover (4) comprises deep drawing the housing cover (4) from sheet metal.

* * * * *